Figure 1:
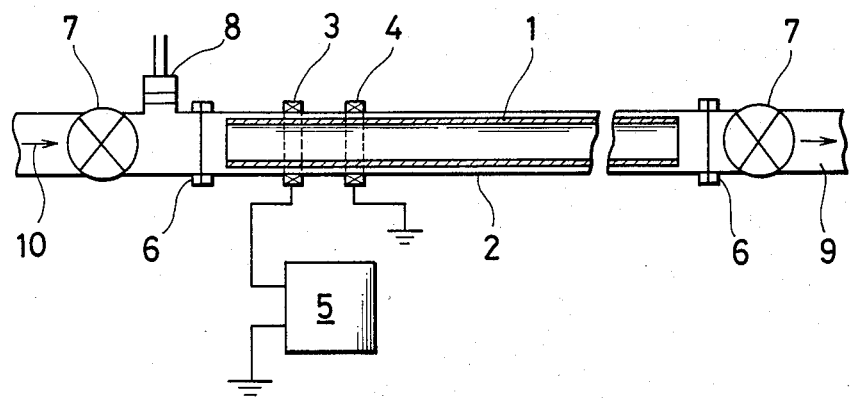

United States Patent [19]

Hatada et al.

[11] Patent Number: 4,488,954
[45] Date of Patent: Dec. 18, 1984

[54] METHOD OF TREATING INNER SURFACE OF PLASTIC TUBE WITH PLASMA

[75] Inventors: Kenji Hatada, Shiga; Osamu Miyajima; Hiroaki Kobayashi, both of Otsu, all of Japan

[73] Assignee: Toray Industries, Inc., Tokyo, Japan

[21] Appl. No.: 471,734

[22] Filed: Mar. 3, 1983

[30] Foreign Application Priority Data

Mar. 12, 1982 [JP] Japan .................. 57-37911

[51] Int. Cl.³ ............................................. H05H 1/24
[52] U.S. Cl. ................................... 204/169; 204/165; 204/168
[58] Field of Search .................. 427/40; 204/165, 168, 204/169

[56] References Cited

U.S. PATENT DOCUMENTS 4,265,276 5/1981 Hatada et al. .................... 138/177

FOREIGN PATENT DOCUMENTS 55-29505 3/1980 Japan .

OTHER PUBLICATIONS

Oberg et al., Machinery's Handbook, Third printing, New York, The Industrial Press, 1956, p. 1061.

Primary Examiner—Evan K. Lawrence
Attorney, Agent, or Firm—Armstrong, Nikaido, Marmelstein & Kubovcik

[57] ABSTRACT

In plasma-treating the inner surface of a plastic tube, the invention provides a treating method which ensures stable treatment under readily operative conditions. The present invention relates to a method comprising the steps of placing a plastic tube inside an electrically insulating tube wherein the difference between the inner diameter of the insulating tube and the outer diameter of the plastic tube is equal to or less than 2 mm, letting a gas into the plastic tube, keeping the inner pressures of both tubes at a reduced pressure, applying a high voltage across electrodes disposed outside the electrically insulating tube to initiate and sustain discharge only inside the plastic tube and thereby plasma-treating the inner surface of the plastic tube.

9 Claims, 2 Drawing Figures

METHOD OF TREATING INNER SURFACE OF PLASTIC TUBE WITH PLASMA

BACKGROUND

This invention relates to a method of treating the inner surface of a plastic tube with plasma. More particularly, the present invention relates to a method of plasma-treating the inner surface of a plastic tube by use of low temperature plasma.

By virtue of their excellent properties, plastics have gained an extremely wide range of applications but their surface properties have not entirely been satisfactory; hence, a variety of surface treatment techniques have been proposed in the past. A surface treatment technique by low temperature plasma, or by so-called glow discharge, provides the advantage that the surface properties can be changed without changing the bulk properties. For this reason, it has been drawing an increasing attention as one of the excellent surface treatment techniques. For example, U.S. Pat. No. 4,265,276 proposes to treat the inner surface of a polyvinyl chloride tube by low temperature plasma so as to modify the properties of the inner surface.

However, it is difficult to initiate and sustain the low temperature plasma in a narrow and limited space such as inside a tube. Another problem lies in that since plastic tubes in general are soft and flexible, the tubes are likely to inwardly collapse once the inside of the tubes is brought into a reduced pressure or a vacuum in order to initiate the glow discharge. It has therefore been believed extremely difficult to subject the inner surface of the tubes to the low temperature plasma surface treatment.

Japanese Patent Laid-Open No. 29505/1980 proposes the following method as set forth in its claim:

"A method of treating the inner surface of a plastic tube characterized in that a plastic tube whose outer surface is exposed to the atmosphere and whose inner surface is kept at a reduced pressure is continuously moved inside an electric field or magnetic field applied by external electrodes, in order to generate low temperature plasma only inside said tube."

However, this method cannot be applied to soft tubes, or, those tubes which undergo deformation or collapse when the tube inner surface is placed into a reduced pressure or vacuum but can be applied only to those plastic tubes which are devoid of flexibility and have rigidity.

The aforementioned U.S. Pat. No. 4,265,276 is characterized in that an electrically insulating tube which is made of a dielectric material and whose internal pressure is kept at a reduced level is disposed outside the plastic tube in order to prevent the deformation and collapse of the plastic tube that occur when the internal pressure is reduced for the purpose of the plasma treatment, and the pressure inside the insulating tube as well as the pressure inside the plastic tube are individually adjusted in order to prevent the occurrence of plasma between the outside of the plastic tube and the inside of the insulating tube.

The inventors of the present invention have carried out a series of experiments of this prior art method and have found that a gas is emitted from the plastic tube or a gaseous matter is afresh formed due to discharge so that the internal pressures of the plastic tube and insulating tube must be controlled in a complicated manner. Still worse, discharge is likely to be stopped readily due to the changes of condition and at times, the discharge shifts into the insulating tube but does not occur inside the plastic tube. Similar phenomena are found occurring even due to slight deviation of matching adjustment.

Within a low pressure range for initiating the glow discharge, no significant difference is found for the discharge initiation voltage with little or no difference for the discharge sustenance voltage. For these reasons, matching adjustment must be made with an extremely high level of accuracy in order to initiate and sustain the discharge for only one of the spaces having such a little pressure difference as in this prior art method. Speaking conversely, this means that matching readily deviates depending upon a slight change of a condition such as a pressure fluctuation, and this presumably explains the phenomena the inventors of the present invention have experienced.

In any way, this is a critical problem to be solved when plasma treatment of plastic tubes is carried out on an industrial scale and hence, the prior art method is not feasible industrially.

SUMMARY

It is therefore a first object of the present invention to provide a method of treating the inner surface of a plastic tube which can be carried out stably in a ready operation condition.

It is a second object of the present invention to provide a method of plasma-treating the inner surface of a plastic tube such as plasticized tube containing a plasticizer and the like in an easy and stable manner.

It is a third object of the present invention to provide a method of easily and stably producing a plasticized polyvinyl chloride tube whose plasticizer is difficult to permeate or to be extracted, by plasma-treating the inner surface of a so-called plasticized polyvinyl chloride tube.

It is a fourth object of the present invention to provide a method of easily and stably producing a plastic tube for medical use which tube is devoid of extract of its plasticizer and the like.

Namely, the present invention relates to a method of plasma-treating the inner surface of a plastic tube comprising the steps of placing said plastic tube inside an electrically insulating tube wherein the difference between the inner diameter of said electrically insulating tube and the outer diameter of said plastic tube is equal to or less than 2 mm, letting a gas into said electrically insulating tube and said plastic tube, holding the inner pressure of both of said tubes at a reduced pressure, applying a high voltage across electrodes diposed outside said electrically insulating tube so as to initiate and sustain discharge only inside said plastic tube and thus plasma-treating the inner surface of said plastic tube.

THE DRAWINGS

Figure 2:
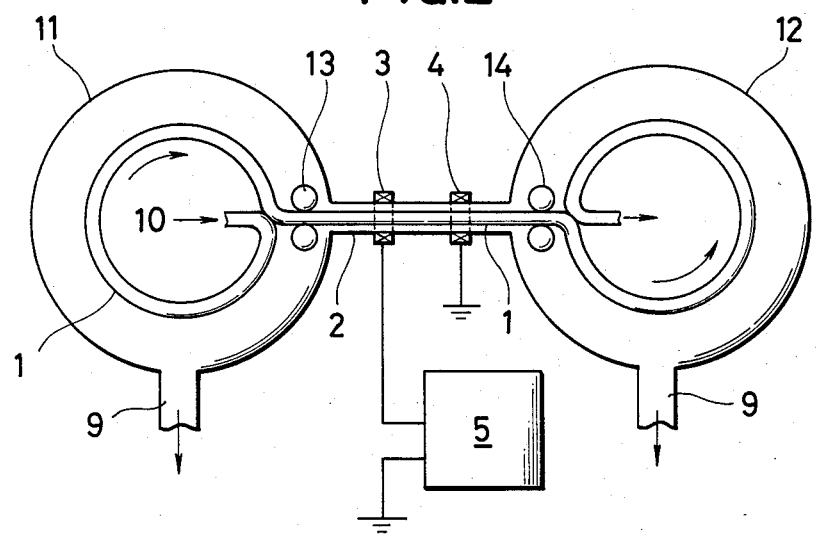

FIG. 1 shows diagrammatically the construction of a discharge processing portion of an apparatus used for practicing the method of the present invention; and FIG. 2 shows diagrammatically the construction of a discharge processing portion of an apparatus used for plasma-treating an elongated plastic tube in accordance with the method of the present invention.

DESCRIPTION

The electrically insulating (dielectric) tubes herein used are those which are made of dielectric materials and have mechanical properties such that they do not undergo deformation or collapse when the tubes are kept at a reduced pressure or a vacuum. Examples of such tubes include glass tubes, ceramic tubes, those made of plastic materials such as polymethyl methacrylate, rigid polyvinyl chloride, and the like.

Since the tube must withstand the heat generated upon discharge, a tube made of an inorganic dielectric material is preferred and in this respect, a glass tube and a ceramic tube are particularly preferred.

The plastic tubes as the object of the plasma treatment are those tubes which are made of polymer compounds generally referred to as "plastics" as typically exemplified by polyethylene, polypropylene, polyester, nylon, polyurethane, polytetrafluoroethylene, polyvinyl chloride, polymethyl methacrylate, and the like.

The term "plastic tube" herein used represents particularly those soft and flexible plastic tubes which undergo deformation or collapse when the internal pressure is reduced or evacuated. Needless to say, these polymer compounds may be not only single substance but also copolymers and mixtures or may further include additives having a low molecular weight.

Soft polyvinyl chloride tubes containing a plasticizer, i.e. plasticized polyvinyl chloride are most preferred because they provide the most significant surface treatment effect.

The term "discharge" used herein means glow discharge, which is also referred to as "low temperature plasma". The physicochemical behaviour of the low temperature plasma and its effect are explained in detail in "Techniques and Applications of Plasma Chemistry" (edited by John R. Mollahan and Alexis T. Bell; John Whiley & Sons, 1974), for example.

The gas to be passed through the tube in the present invention is not limitative, in particular, and may be used either alone or in mixture so long as it can initiate and sustain the glow discharge, is activated during discharge and can modify the inner surface of the plastic tube as desired. A suitable gas should be selected in accordance with the kinds and desired surface properties of the plastic tubes. For instance, Ar and $N_2$ may be employed if a radical is to be formed on the inner surface of the tube and $O_2$, to improve adhesion. Furthermore, Ar and CO may be used to cause crosslinkage on the tube inner surface.

For plasticized polyvinyl chloride tubes and the like that contain at least 5% of a plasticizer are used for medical applications, carbon monoxide is extremely effective and particularly preferred because it can effectively prevent the extract of the plasticizer.

The quantity of the gas to be passed changes depending upon the discharge conditions and the size of the tube. The gas flow quantity must be generally increased for a tube having a greater diameter than for a tube having a smaller diameter even under the same discharge condition.

In the case of the plastic tubes, however, the gas that is emitted from the plastic tube or is emitted afresh from the tube during discharge is difficult to dissipate and is likely to exert adverse influences upon the discharge. Hence, a gas in a greater quantity is preferably passed in such a case than in the ordinary discharge condition.

The pressure, too, may be suitably selected in accordance with the discharge condition. In treating the plastic tube in accordance with the present invention, however, a higher pressure condition than the ordinary discharge treatment is preferably used. For example, the pressure is from 0.1 to 50 Torr and more preferably, from 0.5 to 30 Torr.

Hereinafter, the present invention will be described in further detail with reference to FIG. 1. The drawing is a schematic view of an apparatus for treating a relatively short plastic tube and reference numeral 1 represents a plastic tube (hereinafter referred to simply as the "tube") having an outer diameter $D_1$. Reference numeral 2 is an electrically insulating tube having an inner diameter $D_2$; 3 and 4 are electrodes; 5 is a high voltage source and matching circuit; 6 is a vacuum joint; 7 is a vacuum valve; 8 is a vacuum gauge; 9 is an evacuation system and 10 is communicated with a gas introduction system. This drawing is a schematic view of the discharge treating apparatus for explaining the present invention and only the discharge treatment portion is shown with the electrode delivery system. The gas introduction system and the evacuation system are deleted.

In practicing the method of the present invention, the tube 1 is first inserted into the insulating tube 2. Next, the tube 1 as well as the insulating tube 2 are evacuated with the evacuation system 9 and a throughput quantity is controlled to attain a predetermined internal pressure of the insulating tube 2 while a gas in a predetermined quantity is being caused to flow from the gas introduction system 10. After a predetermined condition is set, a high voltage is applied across the electrode pair 3, 4 from the high voltage source 5 to initiate discharge. Simultaneously with the start of discharge, the electrode pair 3, 4 are moved along the insulating tube 2 and the treatment is carried out over the entire length of the tube 1.

In the present invention, the relation between the outer diameter $D_1$ of the tube 1 and the inner diameter $D_2$ of the insulating tube 2 is of the utmost importance. If $D_2$ is greater by a predetermined value than $D_1$, discharge develops between the outside of the tube and the inside of the insulating tube so that the inner surface of the tube 1 can not be treated. In order to initiate and sustain stably the discharge only inside the tube 1, the relation of at least $(D_2 - D_1) \leq 2$ mm must be satisfied. Preferably, the difference $(D_2 - D_1)$ is less than 1 mm.

If the discharge portion is considered as an equivalent electric circuit, the impedance of the discharge circuit is smaller by the impedance of the tube in the case where discharge is made between the inside of the insulating tube and the outside of the tube than in the case where it is made inside the tube.

Since the tube impedance is great, it is theoretically believed that discharge takes place between the inner wall of the insulating tube and the outside of the tube. According to the experiments carried out by the inventors of the present invention, however, it has been found that discharge is initiated and sustained only inside the tube if $(D_2 - D_1)$ is equal to or less than 2 mm.

Though the reason has not been clarified fully, it is assumed that if $(D_2 - D_1)$ becomes small, electrons and ions generated by discharge initiated and sustained in the space between the inner wall of the insulating and the outside of the tube readily impinge against the wall of the insulating tube and the outer surface of the tube and are extinguished, thereby making it impossible to initiate and sustain the discharge any longer, and even if the impedance of the discharge circuit increases, the discharge circuit becomes more stabilized if discharge is initiated and sustained inside the tube.

The electrodes 3 and 4 in the present invention are fitted to the insulating tube and are generally referred to as the "external electrode". As the electrodes, inductive coupling type electrodes and capacitive coupling electrodes such as shown in FIG. 1 are available. Either type may be used in the present invention but the capacitive coupling type is more preferred because it can sustain stable discharge even when the condition such as pressure changes inside the tube.

The shape of the capacitive coupling type electrode needs not be limited to the cylindrical electrodes 3, 4 shown in FIG. 1; hence, various shapes such as a wheel-like shape may be also employed. The relation of position between the electrode 3 to which the high voltage is applied and the ground electrode 4 is not limited to the relation shown in FIG. 1, in particularly, and it may of course be reversed.

The frequency of the high voltage power source is from 10 KHz to 30 MHz and preferably, from 50 KHz to 1 MHz.

If the frequency is below 10 KHz, the impedance of the insulating tube and that of the tube becomes too great to smoothly initiate discharge or inhibits discharge. If the frequency exceeds 30 MHz, on the other hand, delicate matching must be made during discharge treatment and becomes difficult to follow up the change of the treating condition. If the frequency is from 10 KHz to 30 MHz and preferably from 50 KHz to 1 MHz, matching does not become difficult and discharge can be stably sustained even if the pressure condition and the like changes during treatment.

If the tube becomes thinner, discharge often becomes difficult to initiate. In such a case, discharge can be easily initiated by radiating ultraviolet rays before or simultaneously with the application of the high voltage or by applying a high voltage pulse, or by superposing the high voltage pulse on the power source voltage.

In the case of the apparatus shown in FIG. 1, the internal pressure of the tube 1 is the same as that of the insulating tube 2. Under the relation of the tube outer diameter $D_1$ and the inner diameter $D_2$ of the insulating tube 2 as determined in the present invention, discharge develops only inside the tube and treatment can be easily carried out without complicated procedures such as the adjustment of the internal pressure of the tube in relation to the internal pressure of the insulating tube. Even if the change of the treating conditions such as the pressure change due to the emitted gas takes place during treatment, discharge can not occur between the outside of the tube and the inside of the insulating tube in accordance with the method of the present invention but always occurs only inside the tube so that treatment can be stably carried out.

The apparatus shown in FIG. 1 illustrates an apparatus of the type in which the electrodes are disposed on the linear insulating tube and while these electrodes are being moved along the insulating tube, the entire length of the tube is treated. However, this apparatus has a limit in treating a tube having an extremely elongated length. In such a case, an apparatus such as shown in FIG. 2 is preferably employed.

The treating apparatus shown in FIG. 2 includes two vacuum tanks 11 and 12, which are connected to each other by the insulating tube 2. The electrodes 3 and 4 are disposed outside the insulating tube 2 with a predetermined distance between the electrode 3 and the electrode 4. A feed roller 13 and a take-up roller 14 are disposed at the inlet and outlet of the insulating tube 2, respectively, and a driving device for driving these rollers 13, 14 is disposed.

The elongated tube 1 in the wound form is placed inside the vacuum tank 11 of the continuous treating apparatus thus prepared and one of its end portions is continuously fed into the other vacuum tank 12 through the inside of the insulating tube 2 so as to carry out the discharge treatment in the manner described previously.

In FIG. 2, means for supplying the treating gas into the vacuum tanks 11, 12 and into the tube 1 are now shown definitely but the gas is supplied by a heretofore known method. In this case, the treating gas may be supplied only into the tube 1 or into the vacuum tank 11 with both tube 1 and insulating tube 2 being filled with the gas flow.

When the treating gas is supplied only into the tube 1, the internal pressure becomes higher in the tube 1 than in the insulating tube 2, however in accordance with the method of the present invention, discharge can not occur between the outside of the tube 1 and the inside of the insulating tube 2 but can occur only inside the tube 1.

If the tube itself is so thin as not to have the self-supporting property, the tube is preferably inflated by the utilization of the treating gas to be supplied thereinto.

As described in the foregoing, the method of the present invention is an excellent treating method which makes it possible to stably carry out plasma-treating of the inner surface of the tube by the easy operation of adjusting only the internal pressure of the tube as the object of treatment without being adversely affected by the change of the condition such as the pressure change of the internal pressure of the tube.

Accordingly, the method of the present invention can be effectively used for making the properties of the inner surface of the plastic tube hydrophilic, for activating the properties so as to easily react with other matters, for crosslinking them and for preventing the extract of the plasticizer.

Particularly, those tubes which are obtained by plasma-treating plasticized polyvinyl chloride tubes to prevent extract of the plasticizer are effective as medical tubes.

Hereinafter, the present invention will be illustrated in further detail with reference to Examples thereof.

EXAMPLE 1

Plasticized polyvinyl chloride tubes for medical applications, having an inner diameter of 5 mm, an outer diameter of 7 mm and a length of 2 m and containing 35 parts of a plasticizer, di(2-ethylhexyl) phthalate (D.O.P.), were inserted into glass tubes having various inner diameters and were subjected to plasma-treatment using the apparatus shown in FIG. 1. First, the glass tube and the polyvinyl chloride tube were evacuated. A CO gas was then introduced (at a rate of 10 cc/min) to keep the pressure at 5 Torr. A 100 KHz, 3.5 KV high frequency voltage was then applied across electrodes (with a 15 cm distance between them, which were provided to the glass tube so as to initiate and sustain discharge. Simultaneously with the start of discharge, the electrodes were moved along the glass tube at a rate of 1.5 m/min to treat the entire length of the polyvinyl chloride tube.

The center of the treated tube was cut off in about 20 cm and 3.5 cc of n-hexane was packed into the tube thus cut. Glass rods were then put into both ends to seal the tube. The tube was settled at 40° C. for 2 hours and then D.O.P. in n-hexane was measured by gas chromatograph to determine the D.O.P. quantity eluted into n-hexane from the tube.

It is known that the surface of a polyvinyl chloride is crosslinked by the glow discharge treatment and prevents extract of D.O.P. The less the extract of D.O.P., therefore, the more remarkable becomes the effect of the discharge treatment.

Table 1 illustrates the results of measurement.

TABLE 1

|   |   | Inner diameter of glass tube $D_2$ | $(D_2 - D_1)$ | Extract quantity of D.O.P. | |
|---|---|---|---|---|---|
|   |   |   |   | Extract quantity ($\mu$g/cm$^2$) | Ratio (%) |
| 0 | Untreated tube |   |   | 2,894 | 100 |
| 1 | Plasma-treated tube (Comp. Ex.) | 12 mm | 5 mm | 2,778 | 96 |
| 2 | Plasma-treated tube (Comp. Ex.) | 11 | 4 | 2,780 | 96 |
| 3 | Plasma-treated tube (Comp. Ex.) | 10 | 3 | 2,721 | 94 |
| 4 | Plasma-treated tube (This invention) | 9 | 2 | 29 | 1 |
| 5 | Plasma-treated tube (This invention) | 8 | 1 | 6 | 0.2 |
| 6 | Plasma-treated tube (This invention) | 7.5 | 0.5 | 9 | 0.3 |

It is obvious from the results shown that if the difference between the outer diameter of the polyvinyl chloride tube and the inner diameter of the glass tube $(D_2 - D_1)$ is equal to or below 2 mm, the effect of the treatment becomes remarkable. When $(D_2 - D_1)$ exceeds 3 mm, discharge was observed primarily occurring between the outside of the polyvinyl chloride tube and the inside of the glass tube. If $(D_2 - D_1)$ was below 2 mm, discharge occurred only inside the polyvinyl chloride tube under the aforementioned easy operating condition and the treatment could be made smoothly.

EXAMPLE 2

Plasticized polyvinyl chloride tubes for medical applications, having an outer diameter of 10 mm, an inner diameter of 6 mm and a length of 2 m and containing 61 parts of D.O.P. were inserted into glass tubes having various inner diameters and were then subjected to the discharge treatment in the same way as in Example 1. The treating conditions were as follows:

| CO gas 15 cc/min | pressure 4 Torr |
|---|---|
| frequency 400 KHz | voltage 3.5 KV |
| electrode moving speed | 2 m/min |

The extract quantity of D.O.P. from the treated tubes was determined using 5 cc of n-hexane in the same way as in Example 1.

The results are shown in Table 2.

TABLE 2

|   |   | Inner diameter of glass tube $D_2$ | $(D_2 - D_1)$ | Extract quantity of D.O.P. | |
|---|---|---|---|---|---|
|   |   |   |   | Extract quantity ($\mu$g/cm$^2$) | Ratio (%) |
| 0 | Untreated tube |   |   | 19,207 | 100 |
| 1 | Plasma-treated tube (Comp. Ex.) | 13 mm | 3 mm | 16,821 | 88 |
| 2 | Plasma-treated tube (This invention) | 12 | 2 | 362 | 1.9 |
| 3 | Plasma-treated tube (This invention) | 10.5 | 0.5 | 93 | 0.5 |

The treating effect becomes remarkable if the difference between the outer diameter of the tube and the inner diameter of the glass tube is up to 2 mm, as set forth in the present invention.

EXAMPLE 3

Plasticized polyvinyl chloride tubes for medical applications, having an outer diameter of 5 mm, an inner diameter of 3.5 mm and a length of 2 m and containing 40 parts of D.O.P. were inserted into glass tubes having various inner diameters and were treated under the conditions of CO gas at 10 cc/min, pressure of 8 Torr, frequency of 10 KHz, voltage of 3.5 KV and electrode moving speed of 1.5 m/min.

The extract quantity of D.O.P. from the treated tubes was determined using 2 cc of n-hexane in the same way as in Example 1.

The results are shown in Table 3.

TABLE 3

|   |   | Inner diameter of glass tube $D_2$ | $(D_2 - D_1)$ | Extract quantity of D.O.P. | |
|---|---|---|---|---|---|
|   |   |   |   | Extract quantity ($\mu$g/cm$^2$) | Ratio (%) |
| 0 | Untreated tube |   |   | 2,973 | 100 |
| 1 | Plasma-treated tube (Comp. Ex.) | 8 mm | 3 mm | 2,884 | 97 |
| 2 | Plasma-treated tube (This invention) | 7 | 2 | 74 | 2.5 |
| 3 | Plasma-treated tube (This invention) | 5.5 | 0.5 | 9 | 0.3 |

It is obvious that the extract quantity of D.O.P. drops remarkably when $(D_2 - D_1)$ is equal to or below 2 mm as in the present invention and the inner surface is plasma-treated.

EXAMPLE 4

2 m of the plasticized polyvinyl chloride tube used in Example 1 was inserted into a glass tube having an inner diameter of 7.5 mm and was treated under the same condition as in Example 1.

The treated tube was cut into ten 20 cm-long samples and the extract quantity of D.O.P. from these samples was examined in the same way as in Example 1. The results are shown in Table 4. Incidentally, the sample numbers are put from the direction of the gas introduction portion and a percentage ratio is used with the extract quantity of D.O.P. from an untreated tube being 100%.

TABLE 4

| No. | 1 | 2 | 3 | 4 | 5 | 6 | 7 | 8 | 9 | 10 |
|---|---|---|---|---|---|---|---|---|---|---|
| D.O.P. extract quantity | 0.4 | 0.2 | 0.2 | 0.8 | 0.2 | 0.8 | 0.8 | 0.2 | 0.8 | 0.4 |

It is obvious from the results listed above that treatment is extremely uniform and discharge is stable in accordance with the method of the present invention.

COMPARATIVE EXAMPLE 1

2 m of the same plasticized polyvinyl chloride tube as used in Example 4 was treated using an apparatus of the same kind as disclosed in the aforementioned U.S. Pat. No. 4,265,276 shown in FIG. 1.

The internal pressure of the insulating tube was kept at 20 Torr while the CO gas was caused to flow through the tube at a rate of 15 cc/min at a pressure of 1 Torr. Next, 70 W treating power was applied using a 13.56 MHz high frequency voltage source. Matching adjustment was effected and after discharge became steady, the treatment was carried out while the tube was being continuously moved at a speed of 2 m/min.

The tube thus treated was cut into ten 20 cm-long samples, which were then evaluated in the same way as in Example 4. The results are illustrated in Table 5.

TABLE 5

| No. | 1 | 2 | 3 | 4 | 5 | 6 | 7 | 8 | 9 | 10 |
|---|---|---|---|---|---|---|---|---|---|---|
| D.O.P. extract quantity | 25 | 0.2 | 9 | 68 | 102 | 100 | 102 | 98 | 99 | 101 |

We claim:

1. A method of plasma-treating the inner surface of a plastic tube comprising the steps of:

placing said plastic tube inside an electrically insulating tube, so that the difference between the inner diameter of said electrically insulating tube and the outer diameter of said plastic tube is equal to or less than 2 mm, flowing a gas into said electrically insulating tube and said plastic tube, maintaining the inner pressure of both of said tubes at a reduced pressure, and applying a high voltage across electrodes disposed outside said electrically insulating tube so as to initiate and sustain discharge only inside said plastic tube and thereby plasma-treating the inner surface of said plastic tube.

2. The method of plasma-treating the inner surface of a plastic tube as defined in claim 1 wherein the difference between the inner diameter of said electrically insulating tube and the outer diameter of said plastic tube is less than 1 mm.

3. The method of plasma-treating the inner surface of a plastic tube as defined in claim 1 wherein the frequency of said high voltage to be applied across said electrodes is from 50 KHz to 1 MHz.

4. The method of plasma-treating the inner surface of a plastic tube as defined in claim 1 wherein the degree of said reduced pressure is from 0.5 Torr to 30 Torr.

5. The method of plasma-treating the inner surface of a plastic tube as defined in claim 1 wherein said electrically insulating tube is made of an inorganic dielectric material.

6. The method of plasma-treating the inner surface of a plastic tube as defined in claim 1 wherein said electrically insulating tube is a glass tube.

7. The method of plasma-treating the inner surface of a plastic tube as defined in claim 1 wherein said electrically insulating tube is a ceramic tube.

8. The method of plasma-treating the inner surface of a plastic tube as defined in claim 1 wherein said plastic tube is a plasticized polyvinyl chloride tube.

9. The method of plasma-treating the inner surface of a plastic tube as defined in claim 1 wherein said gas is carbon monoxide gas.

* * * * *